(12) United States Patent
Xiang et al.

(10) Patent No.: US 8,413,745 B2
(45) Date of Patent: Apr. 9, 2013

(54) WATER-BASED MUD LUBRICANT USING FATTY ACID POLYAMINE SALTS AND FATTY ACID ESTERS

(75) Inventors: Tao Xiang, Cypress, TX (US); Remy Azrai Mohd Amin, Kuala Lumpur (MY)

(73) Assignee: Baker Hughes Incorporated, Houston, TX (US)

( * ) Notice: Subject to any disclaimer, the term of this patent is extended or adjusted under 35 U.S.C. 154(b) by 317 days.

(21) Appl. No.: 12/852,930

(22) Filed: Aug. 9, 2010

(65) Prior Publication Data

US 2011/0036579 A1 Feb. 17, 2011

Related U.S. Application Data

(60) Provisional application No. 61/233,015, filed on Aug. 11, 2009.

(51) Int. Cl.
*E21B 21/00* (2006.01)
*C09K 8/035* (2006.01)
*C09K 8/86* (2006.01)

(52) U.S. Cl.
USPC .......... 175/65; 166/244.1; 507/129; 507/138; 507/248; 507/265; 507/925

(58) Field of Classification Search .................. None
See application file for complete search history.

(56) References Cited

U.S. PATENT DOCUMENTS

| | | |
|---|---|---|
| 2,518,439 A | 8/1950 | Fischer et al. |
| 2,550,236 A | 4/1951 | Fischer et al. |
| 2,655,475 A | 10/1953 | Fischer et al. |
| 2,999,814 A | 9/1961 | Laug |
| 3,029,265 A | 4/1962 | Zech |
| 3,177,144 A | 4/1965 | Reamer et al. |
| 3,238,277 A | 3/1966 | Sigan et al. |
| 3,244,638 A | 4/1966 | Foley et al. |
| 3,320,164 A | 5/1967 | Brunel |
| 3,372,112 A | 3/1968 | Parker |
| 3,404,165 A | 10/1968 | Budde et al. |
| 3,528,914 A * | 9/1970 | Darley .......................... 507/107 |
| 3,629,112 A | 12/1971 | Gower et al. |
| 3,654,177 A | 4/1972 | Foley |
| 3,668,129 A | 6/1972 | Willett |
| 3,728,277 A | 4/1973 | Foley |
| 4,012,329 A | 3/1977 | Hayes et al. |
| 4,088,583 A | 5/1978 | Pyle et al. |

(Continued)

FOREIGN PATENT DOCUMENTS

JP 2008095076 A 4/2008

*Primary Examiner* — George Suchfield
(74) *Attorney, Agent, or Firm* — Mossman Kumar & Tyler PC

(57) ABSTRACT

Water-based drilling mud lubricants using a blend of fatty acid polyamine salts and fatty acid esters give synergistically better lubricity results than either component used separately. For example, the blends with different ratios of fatty acid diethylenetriamine salt and fatty acid methyl ester demonstrate much better lubricity in water-based drilling fluids than those where only fatty acid diethylenetriamine salt or fatty acid methyl ester are separately used. The amines in fatty acid amine salt might also include other polyamines, such as butanediamine pentamethylenediamine, spermidine, spermine, propylene diamine and propylene polyamines. The fatty acid esters might also include fatty acid ethyl ester, fatty acid glycerol ester and fatty acid trimethylolpropane ester. The carbon numbers of the fatty acids used to make the components in the lubricant blend may range from C4 to C28.

11 Claims, 5 Drawing Sheets

U.S. PATENT DOCUMENTS

| | | | |
|---|---|---|---|
| 4,144,182 A | 3/1979 | Bereuter | |
| 4,152,915 A | 5/1979 | Bussi et al. | |
| 4,280,915 A | 7/1981 | Kercheville | |
| 4,313,837 A | 2/1982 | Vukasovich et al. | |
| 4,314,919 A | 2/1982 | Washabaugh et al. | |
| 4,374,741 A | 2/1983 | Rieder | |
| 4,412,928 A | 11/1983 | Holstedt et al. | |
| 4,414,125 A | 11/1983 | Keil et al. | |
| 4,432,881 A | 2/1984 | Evani | |
| 4,491,524 A | 1/1985 | Gutierrez et al. | |
| 4,515,699 A | 5/1985 | Oliver, Jr. et al. | |
| 4,575,428 A | 3/1986 | Clapper et al. | |
| 4,663,076 A | 5/1987 | Clapper et al. | |
| 4,670,172 A | 6/1987 | Sproul et al. | |
| 4,689,161 A | 8/1987 | Blumenthal et al. | |
| 4,735,733 A | 4/1988 | Blumenthal et al. | |
| 4,889,938 A | 12/1989 | Kristen et al. | |
| 4,964,615 A | 10/1990 | Mueller et al. | |
| 5,007,489 A | 4/1991 | Enright et al. | |
| 5,049,677 A | 9/1991 | Prout et al. | |
| 5,145,981 A | 9/1992 | Willingham | |
| 5,160,527 A | 11/1992 | Law et al. | |
| 5,185,090 A | 2/1993 | Ryer et al. | |
| 5,188,823 A | 2/1993 | Shapiro et al. | |
| 5,254,531 A | 10/1993 | Mueller et al. | |
| 5,260,268 A | 11/1993 | Forsberg et al. | |
| 5,314,633 A | 5/1994 | Ryer et al. | |
| 5,326,487 A | 7/1994 | Ryer et al. | |
| 5,386,038 A | 1/1995 | Davis et al. | |
| 5,451,564 A | 9/1995 | Austin et al. | |
| 5,534,170 A | 7/1996 | Watts | |
| 5,602,082 A * | 2/1997 | Hale et al. | 507/115 |
| 5,605,879 A | 2/1997 | Halliday et al. | |
| 5,616,544 A | 4/1997 | Kalota et al. | |
| 5,658,860 A | 8/1997 | Clark et al. | |
| 5,707,945 A | 1/1998 | Cooban et al. | |
| 5,807,811 A | 9/1998 | Malchow et al. | |
| 5,837,655 A | 11/1998 | Halliday et al. | |
| 5,846,923 A | 12/1998 | Reierson | |
| 5,874,476 A | 2/1999 | Hsu et al. | |
| 5,905,061 A | 5/1999 | Patel | |
| 5,969,012 A | 10/1999 | Harris, Jr. | |
| 5,977,031 A | 11/1999 | Patel | |
| 5,985,800 A | 11/1999 | Patel | |
| 6,063,737 A | 5/2000 | Haberman et al. | |
| 6,214,219 B1 | 4/2001 | Fisher | |
| 6,218,342 B1 | 4/2001 | Patel | |
| 6,239,183 B1 | 5/2001 | Farmer et al. | |
| 6,284,714 B1 | 9/2001 | Bland et al. | |
| 6,316,394 B1 | 11/2001 | Morgan et al. | |
| 6,464,009 B2 | 10/2002 | Bland et al. | |
| 6,500,790 B1 | 12/2002 | Minnick | |
| 6,506,710 B1 | 1/2003 | Hoey et al. | |
| 6,583,302 B1 | 6/2003 | Erhan et al. | |
| 6,589,917 B2 | 7/2003 | Patel et al. | |
| 6,695,012 B1 | 2/2004 | Ring et al. | |
| 6,699,822 B2 | 3/2004 | Bruner et al. | |
| 6,706,670 B2 | 3/2004 | Kalota et al. | |
| 6,716,799 B1 | 4/2004 | Mueller et al. | |
| 6,767,989 B2 | 7/2004 | Davis et al. | |
| 6,790,811 B2 | 9/2004 | Patel | |
| 6,806,233 B2 | 10/2004 | Patel | |
| 6,806,235 B1 | 10/2004 | Mueller et al. | |
| 6,884,762 B2 | 4/2005 | Breeden et al. | |
| 6,906,009 B2 | 6/2005 | Shinbach et al. | |
| 7,060,661 B2 | 6/2006 | Dobson, Sr. et al. | |
| 7,084,092 B2 | 8/2006 | Patel et al. | |
| 7,094,738 B2 | 8/2006 | Patel et al. | |
| 7,101,829 B2 | 9/2006 | Guichard et al. | |
| 7,152,697 B2 | 12/2006 | Horton et al. | |
| 7,178,594 B2 | 2/2007 | Patel | |
| 7,202,287 B2 | 4/2007 | Cornish et al. | |
| 7,256,159 B2 | 8/2007 | Guichard et al. | |
| 7,347,266 B2 | 3/2008 | Crews et al. | |
| 7,377,721 B2 | 5/2008 | Patel | |
| 7,449,430 B2 | 11/2008 | Guichard et al. | |
| 7,566,686 B2 | 7/2009 | Kippie et al. | |
| 2001/0009890 A1 | 7/2001 | Patel et al. | |
| 2003/0130135 A1 | 7/2003 | Hou et al. | |
| 2004/0072696 A1 | 4/2004 | Patel | |
| 2005/0020455 A1 | 1/2005 | Mapp | |
| 2005/0049150 A1* | 3/2005 | Patel et al. | 507/136 |
| 2005/0124499 A1 | 6/2005 | Shinbach et al. | |
| 2006/0160707 A1 | 7/2006 | Gigel | |
| 2006/0293192 A1 | 12/2006 | Lochel et al. | |
| 2007/0125716 A1 | 6/2007 | Procter et al. | |
| 2007/0167333 A1 | 7/2007 | Hurd et al. | |
| 2007/0249502 A1 | 10/2007 | Procter et al. | |
| 2009/0065736 A1* | 3/2009 | Johnson et al. | 252/88.1 |
| 2009/0318320 A1* | 12/2009 | Kaneko et al. | 508/304 |

* cited by examiner

WATER-BASED MUD LUBRICANT USING FATTY ACID POLYAMINE SALTS AND FATTY ACID ESTERS

CROSS-REFERENCE TO RELATED APPLICATION

This application claims the benefit of U.S. Provisional Patent Application Ser. No. 61/233,015 filed Aug. 11, 2009.

TECHNICAL FIELD

The present invention relates to methods and compositions for conducting operations in wellbores and/or subterranean formations and reservoirs, and more particularly relates, in one non-limiting embodiment, to improving the lubricity of water-based drilling fluids.

BACKGROUND

Drilling fluids used in the drilling of subterranean oil and gas wells along with other drilling fluid applications and drilling procedures are known. In rotary drilling there are a variety of functions and characteristics that are expected of drilling fluids, also known as drilling muds, or simply "muds". The functions of a drilling fluid include, but are not necessarily limited to, cooling and lubricating the bit, lubricating the drill pipe and other downhole equipment, carrying the cuttings and other materials from the hole to the surface, and exerting a hydrostatic pressure against the borehole wall to prevent the flow of fluids from the surrounding formation into the borehole.

Drilling fluids are typically classified according to their base fluid. In water-based muds, solid particles are suspended in water or brine. Oil can be emulsified in the water which is the continuous phase. Brine-based drilling fluids, of course are a water-based mud (WBM) in which the aqueous component is brine. Oil-based muds (OBM) are the opposite or inverse. Solid particles are suspended in oil, and water or brine is emulsified in the oil and therefore the oil is the continuous phase. Oil-based muds can be either all-oil based or water-in-oil macroemulsions, which are also called invert emulsions. In oil-based mud, the oil may consist of any oil that may include, but is not limited to, diesel, mineral oil, esters, or alpha-olefins.

Drilling muds must lubricate both the bearing and cutting surfaces of the drill bit as well as the string of drill pipe both upon rotation and movement along the wellbore horizontally, vertically or any angle. Frequently, in the drilling of wells and especially in directional drilling, the friction between the string of drill pipe and the sides of the borehole may be sufficient to interfere with vertical movement of the pipe into and out of the hole. Such high friction between the drill pipe and the bore hole increases power required to rotate the drill pipe and the increased torque causes wear and stress on the pipe thus decreasing the drilling rate and causing the possibility of pipe twist-off or breakage.

The lubrication characteristics of drilling fluids have been the subject of many investigations. Prior art patents disclose many types of additives for use in petroleum oil based drilling fluids, water-in-oil emulsion drilling fluids, and water-based drilling fluids. Also it has been proposed to incorporate an emulsifier in water-based drilling fluids where the lubricating additive is insoluble in water. Many of the prior additives function as extreme pressure lubricants and are added to the drilling fluid primarily to lubricate the bearings of the drill bit. Some of the known prior art additives also serve to impart sufficient lubricity to the drilling fluid to decrease the friction occurring between the drill string and the sides of the borehole thus increasing the lubricity of the drilling fluid.

It would be desirable if compositions and methods could be devised to aid and improve the lubricity of water-based drilling fluids as alternatives to those presently available to broaden the number of solutions from which the fluid designer may select.

SUMMARY

There is provided, in one non-limiting form, a water-based drilling fluid that includes water and a lubricant blend. The lubricant blend in turn includes a fatty acid polyamine salt and a fatty acid ester.

Alternatively there is provided in one non-restrictive embodiment a method that includes drilling a bore through a subterranean formation using a drilling fluid that contains water as a continuous phase. The method further involves adding before or during drilling a lubricant blend to the drilling fluid. Again, the lubricant blend includes a fatty acid polyamine salt and a fatty acid ester. The amount of lubricant blend in the water-based drilling fluid is effective to increase at least one lubricity property of the water-based drilling fluid as compared to an identical water-based drilling fluid absent the lubricant blend.

In another non-limiting embodiment there is provided a method of lubricating drilling equipment used in conjunction with the drilling completion or workover of a subterranean well. The method involves introducing a water-based fluid into the subterranean well. The water-based fluid includes water and a lubricant blend. The lubricant blend in turn includes a fatty acid polyamine salt and a fatty acid ester. The method further involves contacting the surface of drilling equipment with the water-based fluid to provide an interface on the drilling equipment surface. The interface provides lubrication between the equipment and other solid surfaces the equipment encounters.

Further in another non-restrictive version, a lubricant blend composition is provided that includes a fatty acid polyamine salt and a fatty acid ester. The volume ratio of the fatty acid polyamine salt to fatty acid ester in the lubricant blend may range from about 5/95 to about 95/5.

DETAILED DESCRIPTION

Figure 1:
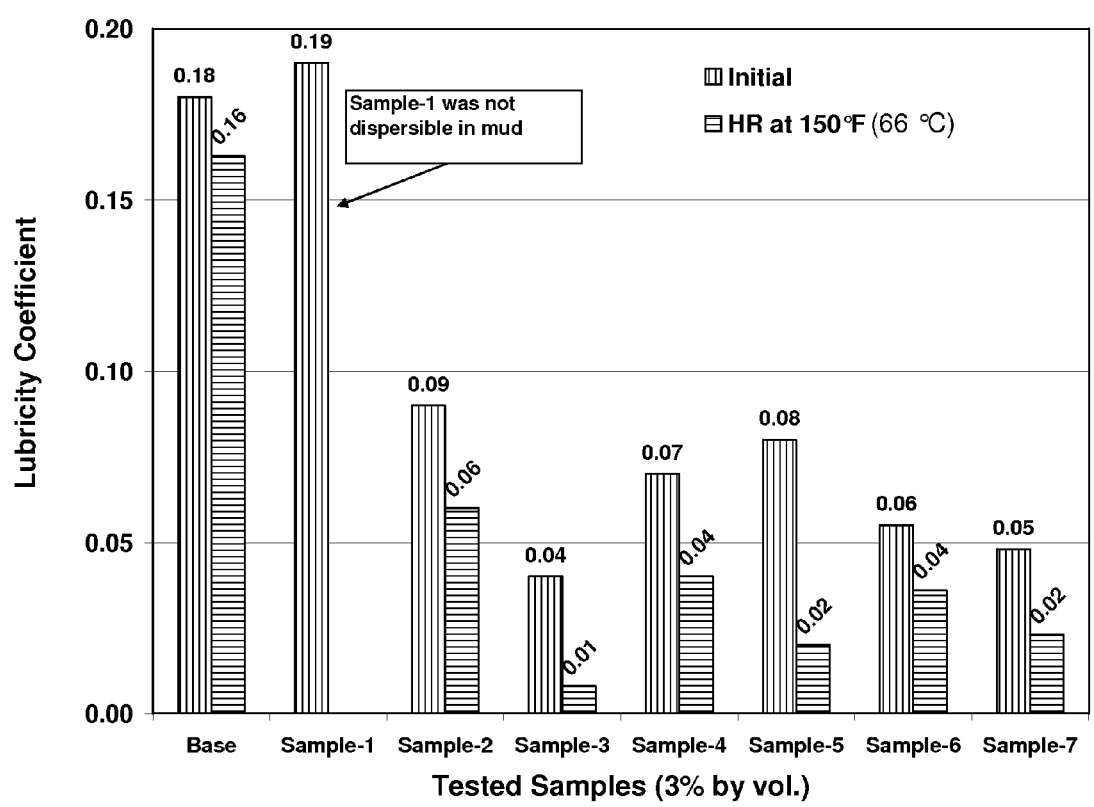
FIG. 1 is a graph of demonstrating the synergistic effect of fatty acid salts of diethylenetriamine and esters on mud lubricity before and after aging at 150° F. (66° C.)

It has been discovered that fatty acid salts of polyamines, such as diethylenetriamine (DETA), provide good synergy when used together with fatty acid esters in increasing the lubricity of water-based drilling fluids. The blends of fatty acid salts of DETA and fatty acid esters demonstrate much better lubricity in water based drilling fluids than those having only fatty acid salts of DETA or only the fatty acid esters.

The fatty acid salts of polyamines are made by reacting fatty acids with polyamines, which may include, but are not necessarily limited to, diethylenetriamine, 1,4-butanediamine, pentamethylenediamine, spermidine, spermine, propylenediamine, other propylene polyamines, and mixtures thereof. The fatty acids used to react with the polyamines include any fatty acid having from 4 to 28 carbon atoms; alternatively, from 10 independently up to 20 carbon atoms. By "independently" herein is meant that any lower threshold may be combined with any upper threshold for the same parameter. These salts may be prepared by any conventional mechanism or reaction and may be generally prepared using a 1:1 stoichiometric ratio of the fatty acid to the primary amine functionality.

The other component of the lubricant blend, fatty acid esters, may include, but are not necessarily limited to, fatty acid 1,3-dioxane-5,5-dimethanol esters, fatty acid 2-ethyl-1-hexanol esters, fatty acid methyl esters, fatty acid ethyl esters, fatty acid glycerol esters, fatty acid trimethylolpropane esters, and mixtures thereof. Fatty acid esters suitable for the lubricant blend may be made by known techniques and methods of reacting the fatty acids with an alcohol. The fatty acids used to react with the alcohols include any fatty acid having from 4 to 28 carbon atoms; alternatively, from 10 independently up to 20 carbon atoms. Suitable alcohols, glycols and polyols used to react with the fatty acids include, but are not necessarily limited to 1,3-dioxane-5,5-dimethanol, 2-ethyl-1-hexanol, methanol, ethanol, glycerol, trimethylolpropane, and mixtures thereof. Alternatively, the alcohols, glycols and polyols may have from 1 to 8 carbon atoms. In one non-limiting embodiment the alcohol is multifunctional, such as a glycol or polyol. These esters may be generally prepared using a 1:1 or 1:2 or 1:3 stoichiometric ratio of the fatty acid to the alcohol functionality. The fatty acids may be the same as or different from the ones used to make the fatty acid salts of polyamines. Both of these components, the fatty acid polyamine salt and fatty acid ester, are water soluble.

The volume ratio of fatty acid polyamine salt to fatty acid ester in the lubricant blend may range from about 5/95 to about 95/5; in one non-limiting embodiment from about 5/95 independently up to about 80/20; alternatively from about 20/80 independently up to about 60/40.

The amount of the lubricant blend that may be advantageously used in a water-based drilling fluid is any amount or proportion that is effective to increase at least one lubricity property of the water-based drilling fluid as compared to an identical water-based drilling fluid absent the lubricant blend. In one non-limiting embodiment, the amount of lubricant blend in the water-based drilling fluid ranges from about 0.5 to about 7 vol %. In an alternate, non-restrictive version the amount of lubricant blend may range from about 1 independently up to about 3 vol %.

It is understood that in the practice of the compositions and methods described herein, the water-based drilling fluid may also include any of the functional additives and components known to those of skill in the art, such as antioxidants, bentonites, barite, gums, water soluble polymers, viscosity modifying agents, breakers, emulsifiers, surfactants, thinners, circulation control additives, purified paraffins, isomerized olefins, salts for brine formation, and the like.

Additionally, while the compositions and methods have been illustrated by reference to water based fluids, it is to be understood that the compositions and methods may also be used in emulsion fluids, particularly oil-in-water drilling fluids. It is further expected that the lubricant blend described herein may find use as a rate of penetration (ROP) enhancer or as a spotting fluid.

The lubricant blends described herein may also contain a solvent. Suitable solvents include, but are not necessarily limited to, low molecular weight esters, low molecular weight alcohols, low molecular weight glycols, and combinations thereof. By "low molecular weight" is meant a weight average molecular weight of from 40 to about 150, stated alternatively having from 3 to 12 carbon atoms and from 1 to 5 oxygen atoms. The amount of solvent in the lubricating blend may range from about 2 to about 60 volume %, alternatively from about 10 independently to about 20 volume %. In one non-limiting embodiment, suitable solvents are ethylene glycol (also known as monoethylene glycol or MEG) and triethylene glycol (TEG).

Lubricity properties increased or improved by the lubricity blends and methods described herein include, but are not necessarily limited to, decreasing or improving the lubricity coefficient, reducing or improving torque and drag, preventing stuck pipes caused by differential sticking, preventing bit balling, being non-damaging to producing zones, being non-toxic and environmentally friendly, and the like.

The invention will now be described with respect to certain Examples which are not intended to limit the invention in any way, but rather to further illuminate it with respect to certain non-limiting embodiments.

EXAMPLE 1

A synergistic effect between fatty acid salts of diethylenetriamine (DETA) and fatty acid esters on improving water-based mud lubricity has been observed. The fatty acid esters used in these Examples are fatty acid esters of 1,3-dioxane-5,5-dimethanol. As shown in FIG. 1, the samples made by blending fatty acid salts of DETA and fatty acid esters (Sample 3, Sample 4, Sample 5, Sample 6 and Sample 7 in Table II) demonstrate much better lubricity in water-based drilling fluids than those fluids where only fatty acid salts of DETA (Sample 1 in Table II) or only fatty acid esters (Sample 2 in Table II) are used.

TABLE I

| BASE MUD FORMULATION FOR THE TESTS SHOWN IN FIG. 1 | |
|---|---|
| Water, bbl (liter) | 0.82 (130) |
| MILGEL ®, lb (kg) | 6 (2.7) |
| XAN-PLEX ® D, lb (kg) | 0.3 (1.4) |
| NaHCO₃, lb (kg) | 0.5 (0.23) |
| NEW DRILL ® PLUS, lb (kg) | 0.5 (0.23) |
| BIO-LOSE ®, lb (kg) | 2 (0.91) |
| MIL-PAC ™ LV, lb (kg) | 1 (0.45) |
| KCl, lb (kg) | 25 (11) |
| MIL-BAR ®, lb (kg) | 153 (69) |
| Rev Dust, lb (kg) | 27 (12) |

TABLE II

LABORATORY SAMPLE COMPOSITIONS

| Tested Samples (3% by vol.) | Description of Sample (volume %) | Lubricity Coefficient (Initial) | Lubricity Coefficient (HR at 150° F. (66° C.)) |
|---|---|---|---|
| Base | Formulation is shown in Table 1 | 0.18 | 0.16 |
| Sample 1 | 100% fatty acid salts of DETA | 0.19* | — |

TABLE II-continued

LABORATORY SAMPLE COMPOSITIONS

| Tested Samples (3% by vol.) | Description of Sample (volume %) | Lubricity Coefficient (Initial) | Lubricity Coefficient (HR at 150° F. (66° C.)) |
|---|---|---|---|
| Sample 2 | 100% fatty acid ester-1 | 0.09 | 0.06 |
| Sample 3 | 50% fatty acid ester-1 + 50% Fatty acid salts of DETA | 0.04 | 0.01 |
| Sample 4 | 80% methyl stearate/methyl oleate/methyl linoleate + 20% fatty acid salts of DETA | 0.07 | 0.04 |
| Sample 5 | 60% pentaerythritol tetracaprylate/caprate + 20% fatty acid ester-1 + 20% fatty acid salts of DETA | 0.08 | 0.02 |
| Sample 6 | 60% pentaerythritol tetracaprylate/caprate + 40% fatty acid salts of DETA | 0.06 | 0.04 |
| Sample 7 | 60% crude palm oil + 40% fatty acid salts of DETA | 0.05 | 0.02 |

Note:
*Sample was not dispersible in the mud.

EXAMPLE 2

Figure 2:
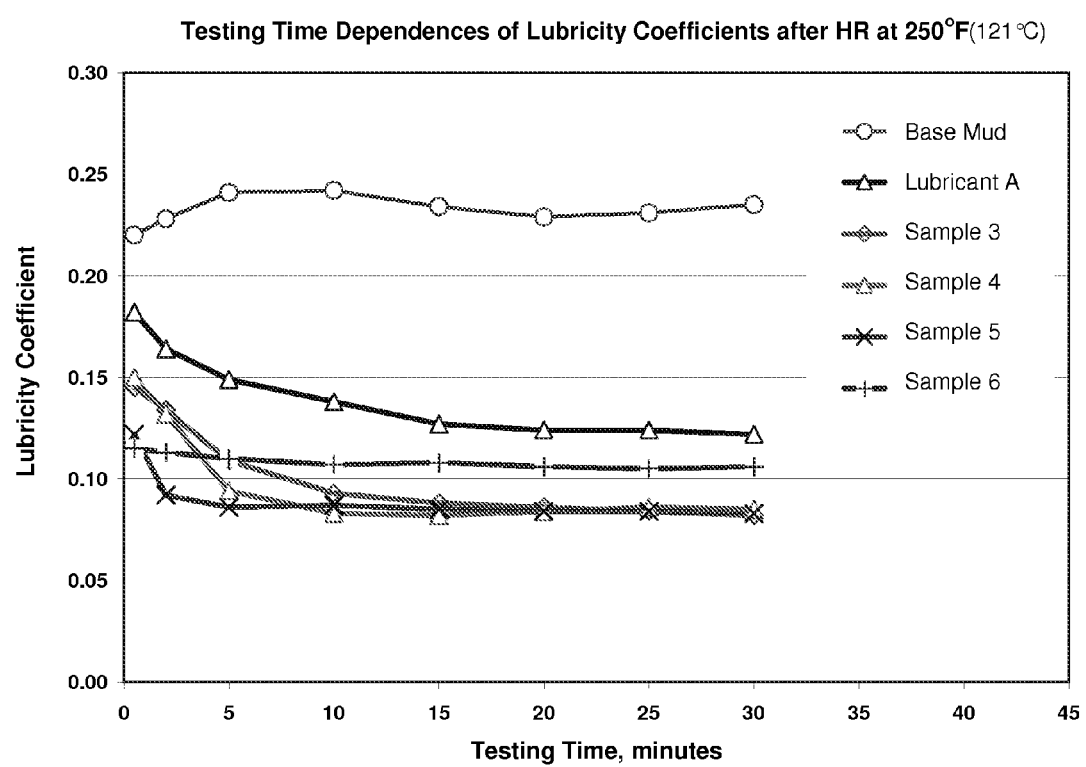
FIG. 2 is a graph comparing the time dependence of lubricity coefficient for laboratory samples with a commercially available Lubricant A before and after aging at 250° F. (121° C.) for 16 hours.

After aging at 250° F. (121° C.) for 16 hours, these laboratory samples performed better than a standard lubricant used in drilling fluid industry. FIG. 2 shows the comparison of the time dependence of lubricity coefficient for laboratory samples with a commercial available lubricity product termed "Lubricant A" herein (a mixture of fatty acids, esters with polyol and fatty acids C16-18 and C18-unsaturated compounds with 2,2,2"-nitriloethanol) after aging at 250° F. (121° C.) for 16 hours (sample compositions are shown by Table II). It may be seen that the lubricity coefficient is lowest for Samples 3, 4, 5 and 6 of the present composition in contrast to the base mud only and the commercial lubricant.

TABLE III

MUD FORMULATION USED FOR THE TESTS SHOWN BY FIG. 2

| | |
|---|---|
| Water, bbl (liter) | 0.82 (130) |
| MILGEL, lb (kg) | 6 (2.7) |
| NaOH, lb (kg) | 0.4 |
| NEW-DRILL PLUS, lb (kg) | 0.5 (0.23) |
| MIL-PAC LV, lb (kg) | 1 (0.45) |
| BIO-LOSE, lb (kg) | 4 (1.8) |
| ALL-TEMP ™, lb (kg) | 1 (0.45) |
| KCl, lb (kg) | 25 (11) |
| Malay Barite, lb (kg) | 153 (69) |
| Rev Dust, lb (kg) | 36 (16) |

EXAMPLE 3

Figure 3:
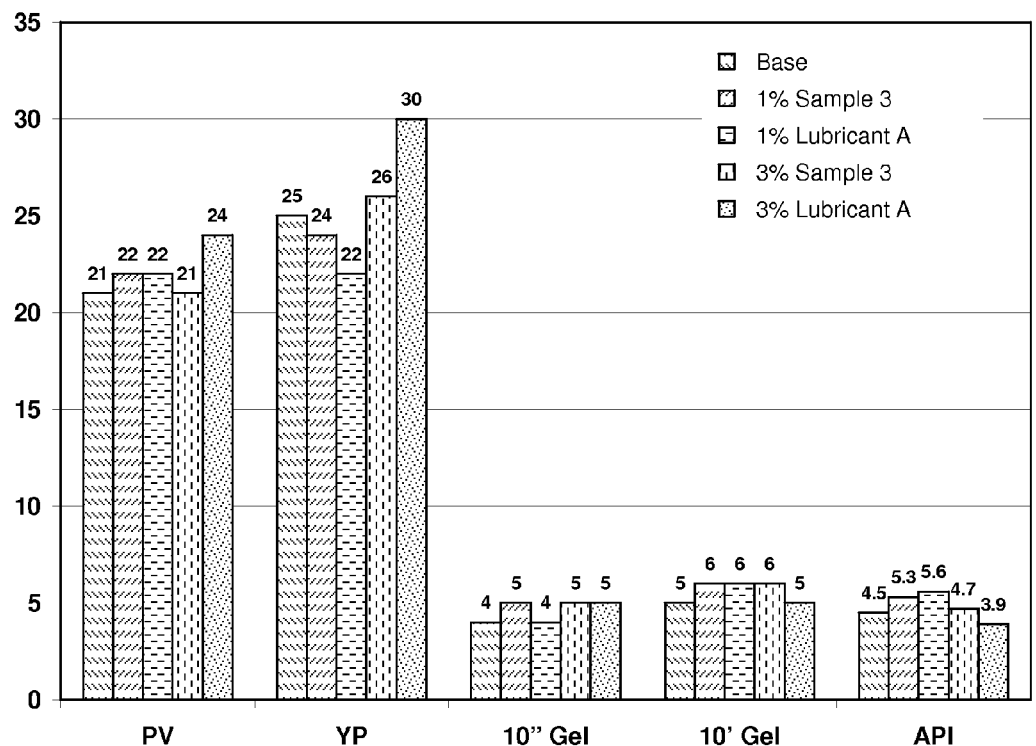
FIG. 3 is a graph comparing the effect on initial mud properties for Sample 3 (shown by Table 2) with a commercially available Lubricant A.
Figure 4:
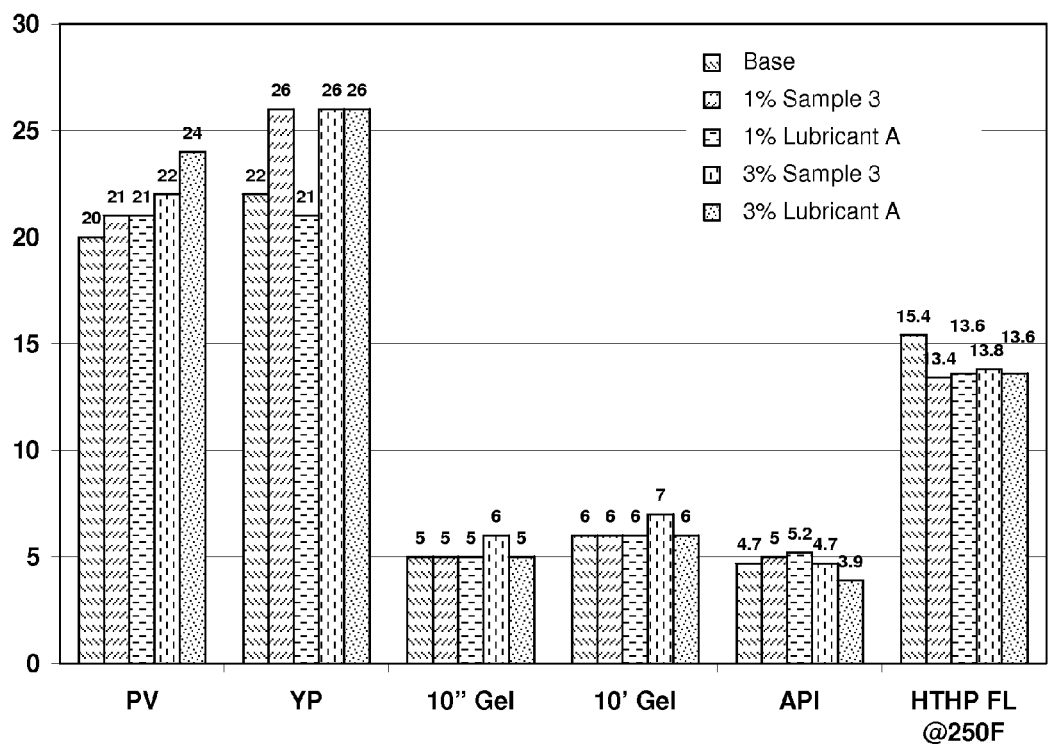
FIG. 4 is a graph comparing the effects on mud properties for Sample 3 (shown by Table 2) with a commercially available Lubricant A after being hot rolled at 250° F. (121° C.) for 16 hours.
Figure 5:
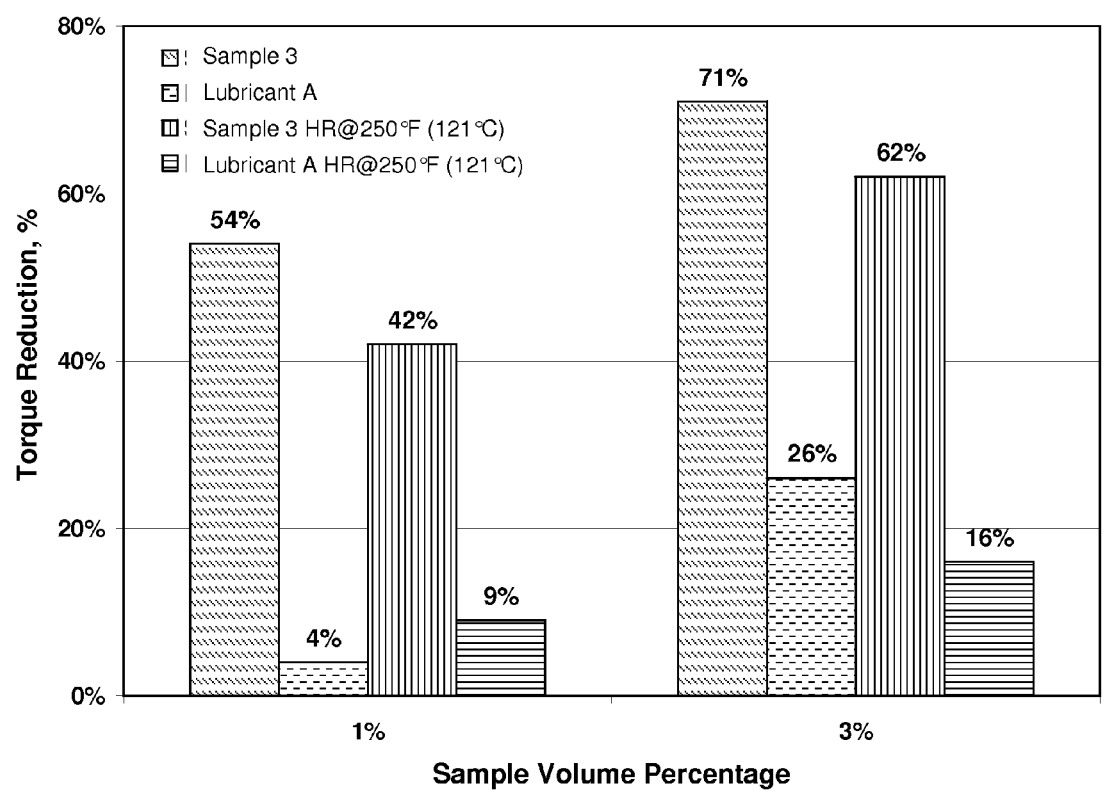
FIG. 5 is a graph comparing the effect on torque reduction for Sample 3 with a commercially available Lubricant A before and after aging at 250° F. (121° C.) for 16 hours.

Further comparison of a 50/50 vol/vol blend of fatty acid salt of DETA and fatty acid ester-1 with commercially available Lubricant A in 10 lb/gal (1.2 kg/liter) 8% KCl mud system is made in Tables IV and V, and FIGS. 3, 4, and 5. Again, it may be seen that Sample 3 outperforms the commercial lubricant. This is particularly true with respect to the torque reduction results shown in FIG. 5.

TABLE IV

Compositions of Fluids Used in Table V and FIGS. 3, 4 and 5

| | | | | | |
|---|---|---|---|---|---|
| Water, bbl (liter) | 0.89 (141) | 0.89 (141) | 0.89 (141) | 0.89 (141) | 0.89 (141) |
| Soda Ash, lb (kg) | 0.5 (0.22) | 1 (0.45) | 1 (0.45) | 1 (0.45) | 1 (0.45) |
| FLOWZAN ®, lb (kg) | 0.5 (0.22) | 0.5 (0.22) | 0.5 (0.22) | 0.5 (0.22) | 0.5 (0.22) |
| NEW-DRILL ® HP, lb (kg) | 3 (1.4) | 3 (1.4) | 3 (1.4) | 3 (1.4) | 3 (1.4) |
| MIL-PAC ™ LV, lb (kg) | 2 (0.9) | 2 (0.9) | 2 (0.9) | 2 (0.9) | 2 (0.9) |
| BIO-LOSE ®, lb (kg) | 3 (1.4) | 3 (1.4) | 3 (1.4) | 3 (1.4) | 3 (1.4) |
| MIL-CARB ®, lb (kg) | 10 (4.5) | 10 (4.5) | 10 (4.5) | 10 (4.5) | 10 (4.5) |
| KCl, lb (kg) | 24.1 (10.9) | 24.1 (10.9) | 24.1 (10.9) | 24.1 (10.9) | 24.1 (10.9) |
| LC-LUBE ™ FINE, lb (kg) | 10 (4.5) | 10 (4.5) | 10 (4.5) | 10 (4.5) | 10 (4.5) |
| Malay Barite, lb (kg) | 40.5 (18.4) | 40.5 (18.4) | 40.5 (18.4) | 40.5 (18.4) | 40.5 (18.4) |
| Sample-3, % by vol. | — | 1 | — | 3 | — |
| Lubricant A, % by vol. | — | — | 1 | — | 3 |

TABLE V

Comparison of the Effect on Mud Properties for Sample 3 (shown by Table II) With Lubricant A Before and After aging at 250° F. (121° C.) for 16 Hours

| Initial Properties | | | | | |
|---|---|---|---|---|---|
| 600 rpm @ 120° F. (49° C.) | 67 | 68 | 66 | 68 | 78 |
| 300 rpm | 46 | 46 | 44 | 47 | 54 |
| 200 rpm | 35 | 37 | 35 | 37 | 42 |
| 100 rpm | 24 | 25 | 23 | 25 | 28 |
| 6 rpm | 5 | 6 | 5 | 6 | 6 |
| 3 rpm | 4 | 5 | 4 | 5 | 4 |
| PV, cP | 21 | 22 | 22 | 21 | 24 |
| YP, lb/100 ft$^2$ (N/m$^2$) | 25 (12) | 24 (12) | 22 (11) | 26 (13) | 30 (15) |
| 10" Gel, lb/100 ft$^2$ (N/m$^2$) | 4 (1.9) | 5 (2.4) | 4 (1.9) | 5 (2.4) | 5 (2.4) |
| 10' Gel, lb/100 ft$^2$ (N/m$^2$) | 5 (2.4) | 6 (2.9) | 6 (2.9) | 6 (2.9) | 5 (2.4) |
| pH | 9.7 | 9.5 | 9.8 | 8.9 | 8.8 |
| Lubricity coefficient | 0.196 | 0.091 | 0.189 | 0.056 | 0.146 |
| API Fluid loss, ml/30 minutes | 4.5 | 5.3 | 5.6 | 4.7 | 3.9 |
| Properties after HR at 250° F. (121° C.), for 16 hours | | | | | |
| 600 rpm @ 120° F. (49° C.) | 62 | 68 | 63 | 70 | 74 |
| 300 rpm | 42 | 47 | 42 | 48 | 50 |
| 200 rpm | 34 | 38 | 33 | 39 | 39 |
| 100 rpm | 23 | 26 | 22 | 27 | 26 |
| 6 rpm | 6 | 6 | 6 | 7 | 6 |
| 3 rpm | 5 | 5 | 5 | 6 | 5 |
| PV, cP | 20 | 21 | 21 | 22 | 24 |
| YP, lb/100 ft$^2$ (N/m$^2$) | 22 (11) | 26 (13) | 21 (10) | 26 (13) | 26 (13) |
| 10" Gel, lb/100 ft$^2$ (N/m$^2$) | 5 (2.4) | 5 (2.4) | 5 (2.4) | 6 (2.9) | 5 (2.4) |
| 10' Gel, lb/100 ft$^2$ (N/m$^2$) | 6 (2.9) | 6 (2.9) | 6 (2.9) | 7 (3.4) | 6 (2.9) |
| pH | 9.0 | 9.0 | 9.0 | 8.4 | 7.7 |
| Lubricity coefficient | 0.154 | 0.090 | 0.140 | 0.058 | 0.130 |
| API Fluid loss, mL/30 minutes | 4.7 | 5 | 5.2 | 5.3 | 4.1 |
| HTHP FL at 250° F. (121° C.), mL/30 minutes | 15.4 | 13.4 | 13.6 | 13.8 | 13.6 |

In the foregoing specification, the invention has been described with reference to specific embodiments thereof, and has been suggested as effective in providing effective methods and compositions for improving the lubricity of water-based drilling fluids for boring in wellbores and subterranean reservoirs and formations. However, it will be evident that various modifications and changes may be made thereto without departing from the broader spirit or scope of the invention. Accordingly, the specification is to be regarded in an illustrative rather than a restrictive sense. For example, specific combinations of components for forming the water-based drilling fluids, such as fatty acid polyamine salts, fatty acid esters, surfactants, other additives and proportions thereof falling within the claimed parameters, but not specifically identified or tried in a particular fluid to improve the lubricity as described herein, are anticipated to be within the scope of this invention.

The present invention may suitably comprise, consist or consist essentially of the elements disclosed and may be practiced in the absence of an element not disclosed. For example, the lubricant blend may consist of or consist essentially of at least one fatty acid polyamine salt and at least one fatty acid ester.

The words "comprising" and "comprises" as used throughout is to interpreted "including but not limited to".

GLOSSARY

| | |
|---|---|
| ALL-TEMP ™ | Derivatized synthetic interpolymer deflocculant and rheological stabilizer available from Baker Hughes Drilling Fluids. |
| BIO-LOSE ® | Derivatized starch available from Baker Hughes INTEQ. |
| FLOWZAN ® | Xanthan gum biopolymer suspended in a glycol ether available from Drilling Specialties Company. |
| LC-LUBE ™ FINE | A sized, synthetic graphite to prevent lost circulation in water-based and invert-emulsion mud systems, available from Baker Hughes Drilling Fluids. |
| MIL-BAR ® | Barite weighting agent available from Baker Hughes INTEQ. |
| MILGEL ® viscosifier | Premium-grade bentonite available from Baker Hughes Drilling Fluids. |
| MIL-PAC ™ | Low viscosity polyanionic cellulose available from Baker Hughes INTEQ (sometimes abbreviated as PacLV). |
| NEW DRILL ® PLUS | Partially hydrolyzed polyacrylamide available from Baker Hughes INTEQ. |
| XAN-PLEX ® D gum | Biopolymer available from Baker Hughes INTEQ. |

What is claimed is:

1. A method comprising:
   drilling a bore through a subterranean formation using a drilling fluid comprising water as a continuous phase; and
   adding before or during drilling a lubricant blend to the drilling fluid comprising:
      at least one fatty acid polyamine salt; and
      at least one fatty acid ester;
   where the amount of lubricant blend in the water-based drilling fluid is effective to increase at least one lubricity property of the water-based drilling fluid as compared to an identical water-based drilling fluid absent the lubricant blend.

2. The method of claim 1 where the amount of lubricant blend in the water-based drilling fluid ranges from about 0.5 to about 7 vol %.

3. The method of claim 1 where the volume ratio of fatty acid polyamine salt to fatty acid ester in the lubricant blend ranges from about 5/95 to about 95/5.

4. The method of claim 1 where the fatty acid used to make the fatty acid polyamine salt and the fatty acid ester may be the same or different and each has from 4 to 28 carbon atoms.

5. The method of claim 1 where:
   the polyamine in the fatty acid polyamine salt is selected from the group consisting of diethylenetriamine, butanediamine, pentamethylenediamine, spermidine, spermine, propylene diamine, propylene polyamines and mixtures thereof; and
   the fatty acid ester is selected from the group consisting of fatty acid methyl esters, fatty acid ethyl esters, fatty acid glycerol esters, fatty acid trimethylolpropane esters and mixtures thereof.

6. A method of lubricating drilling equipment used in conjunction with the drilling, completion or workover of a subterranean well, the method comprising:
   introducing a water-based fluid into the subterranean well, where the water-based fluid comprises:
      water; and
      a lubricant blend comprising:
         at least one fatty acid polyamine salt; and
         at least one fatty acid ester; and
   contacting the surface of drilling equipment with the water-based fluid to provide an interface on the drilling equipment surface.

7. The method of claim 6 where the amount of lubricant blend in the water-based fluid is effective to increase at least one lubricity property of the water-based fluid as compared to an identical water-based fluid absent the lubricant blend.

8. The method of claim 7 where the amount of lubricant blend in the water-based fluid ranges from about 0.5 to about 7 vol %.

9. The method of claim 6 where the volume ratio of fatty acid polyamine salt to fatty acid ester in the lubricant blend ranges from about 5/95 to about 95/5.

10. The method of claim 6 where the fatty acid used to make the fatty acid polyamine salt and the fatty acid ester may be the same or different and each has from 4 to 28 carbon atoms.

11. The method of claim 6 where:
   the polyamine in the fatty acid polyamine salt is selected from the group consisting of diethylenetriamine, butanediamine, pentamethylenediamine, spermidine, spermine, propylene diamine, propylene polyamines and mixtures thereof; and
   the fatty acid ester is selected from the group consisting of fatty acid methyl esters, fatty acid ethyl esters, fatty acid glycerol esters, fatty acid trimethylolpropane esters and mixtures thereof.

* * * * *